United States Patent [19]

Russell et al.

[11] Patent Number: 4,478,779

[45] Date of Patent: Oct. 23, 1984

[54] ELECTROLESSLY PLATED MOLD SURFACE AND METHOD OF USING

[75] Inventors: Alexander H. Russell, Owings Mills; John L. McClinton, Hanover; John A. Sergovic, Severna Park, all of Md.

[73] Assignee: The Burns & Russell Company, Baltimore, Md.

[21] Appl. No.: 526,145

[22] Filed: Aug. 24, 1983

[51] Int. Cl.³ ............................................. B28B 3/00
[52] U.S. Cl. ................................. 264/319; 249/135; 264/279.1; 264/338; 427/135; 427/282
[58] Field of Search ................. 264/219, 279.1, 338, 264/319; 249/135; 427/282, 135, 434.3; 148/6.35

[56] References Cited

U.S. PATENT DOCUMENTS

| | | | |
|---|---|---|---|
| 2,543,710 | 2/1951 | Schmidt | 148/6.35 |
| 4,031,289 | 6/1977 | Sergovic | 428/404 |
| 4,264,646 | 4/1981 | Thornburg et al. | 427/282 |
| 4,364,780 | 12/1982 | Blanken | 148/6.35 |

OTHER PUBLICATIONS

Ency. of Chem. Tech., Third Ed., vol. 8, pp. 738-750, Gerald Krucik, "Electroless Plating."
Metal Finishing Guide Book and Directory, "Electroless Plating", Nathan Feldstein, p. 516.
Plating, "Selective Electroless Plating Techniques: A Survey", Aug. 1970, p. 804, Nathan Feldstein.

Primary Examiner—Jay H. Woo
Assistant Examiner—Mike McGurk
Attorney, Agent, or Firm—Cushman, Darby & Cushman

[57] ABSTRACT

A method of coating a surface of an article block includes utilizing a mold that has its interior surface electrolessly coated with a metal such as nickel where the mold is made from mild steel and further includes depositing a resinous composition in the coated metal mold and then inserting a surface of the article and then subsequently curing the composition by exposing the mold to heat; the exterior surface of the mold is oxidized and darkened to increase the capacity for the mold to absorb radiant heat; a method of preparing the mold is provided where the mold is electrolessly coated with the metal while the exterior surface thereof is masked to prevent the deposition of the coating metal on the exterior surface.

17 Claims, 4 Drawing Figures

ELECTROLESSLY PLATED MOLD SURFACE AND METHOD OF USING

BACKGROUND AND SUMMARY OF THE INVENTION

The present invention relates to a method of forming a molded article and in one embodiment to a casting method wherein a resinous composition such as polyester or an epoxy resin is coated on the exterior surface of an article in order to provide a decorative surface as well as a liquid barrier to the article. In the past, either stainless steel or porcelain coated molds have been employed to provide the smooth surface on molded articles and coatings for castings and building materials including blocks such as concrete or cinderblock. The molding compositions are disclosed in U.S. Pat. Nos. 2,751,775; 3,328,231; 3,632,725, 4,031,289 and 4,329,822, the disclosures of which are hereby incorporated by reference and relied upon. However, the use of stainless steel molds in the production of a smooth coating on porous building blocks such as those disclosed in the first four of the aforementioned U.S. Patents has always resulted in the so-called "halo effect" upon curing of the resin. This appears as a non-uniformity in the form of a dull area in the surface of the molded material which is due to the non-uniform conductance of heat through the stainless steel mold.

To combat this non-uniformity in curing, it has been proposed to use a porcelain coated mild steel mold which, to a large extent, obviated this difficulty. However, the use of a porcelain coated metal mold suffers from the disadvantage that the useful life of such molds is unacceptably brief due to the fact that the porcelain easily became chipped or disfigured during use partially as a result of the rough handling of such molds by unskilled labor in the casting of the molded article. Various other coating techniques have been suggested, such as the electrolytic deposition of a coating metal on a metal substrate for the mold. While significant economies were realized, it has been found that the electrolytic deposition of a coating metal on a mold often resulted in adverse reaction with the molding compositions.

Accordingly, it is an object of the present invention to provide a method of molding a composition where the mold employed has been coated with an electroless deposition layer of a metal that is non-reactive with the resinous composition and the method of making a mold of the type used in the method of the present invention wherein nickel is electrolessly deposited on the interior surface of a metal mold where the mold metal itself is a mild steel the exterior surface is masked to prevent the deposition of the nickel thereon so that the exterior surface of the mold can be rendered, as by oxidation, uniformly receptive to heat whereby the heat will be uniformly dispersed to the molding composition while the composition is being cured. Further, the method of the present invention includes oxidizing the exterior surface of the mold to effect better heat absorption during the curing step.

To summarize the method of the present invention, a metal mold such as a cold or hot rolled steel or aluminum but preferably a mild steel metal mold that has its interior molding surface coated with a layer of nickel metal by an electroless deposition process is supplied with a resin composition in flowable form such as polyester resin or an epoxy resin which may contain a pigment and a filler such as sand. Next, a support member such as, for example, the surface of a building block is deposited in the mold and is coated by the resin composition. Support members such as those described in U.S. Pat. No. 4,328,822 may also be employed. Subsequently, the exterior surface of the mold is exposed to heat sufficient to cure the resin composition and to provide a secure attachment of the resin to the exterior surface of the support member. During curing, the composition will be hardened and be bonded to the support member such as the porous surface of a masonry unit.

After curing, the member with the resin material bonded to its surface, is removed from the mold and the mold is made ready for re-use.

With the method of the present invention, it has been found that the resulting product gives a uniform appearance to the molded composition without creating an adverse reaction with the mold surfaces, holes in the form or nonuniformities in the smooth surface.

In addition, the mold of the present invention can be repeatedly used during a substantially great number of curing operations than is possible with porcelain coated molds which offer the required repair or replacement after a single molding cycle.

The foregoing and other advantages will become apparent as consideration is given to the following description taken in conjunction with the accompanying drawings, in which:

DETAILED DESCRIPTION OF THE INVENTION

While the present invention is particularly useful in the field of coating masonry building units with unsaturated polyester resins such as those disclosed in the first four of the aforementioned U.S. patents, the disclosures of which were incorporated by reference herein and relied upon, it will be understood that other types of support members such as those described in U.S. Pat. No. 4,329,822 may be employed in the present invention. As described in several of the aforementioned U.S. patents, relatively inexpensive masonry units can be provided with a coating surface to produce a decorative, serviceable surface thereon which does not require any finishing after a wall is erected with such blocks. In its broader aspects, however, the present invention encompasses the molding of an article, including support members with a mold made according to this invention.

According to the present invention, the molding compositions disclosed in the aforementioned U.S. patents may be employed with the method of the present invention.

Figure 1:
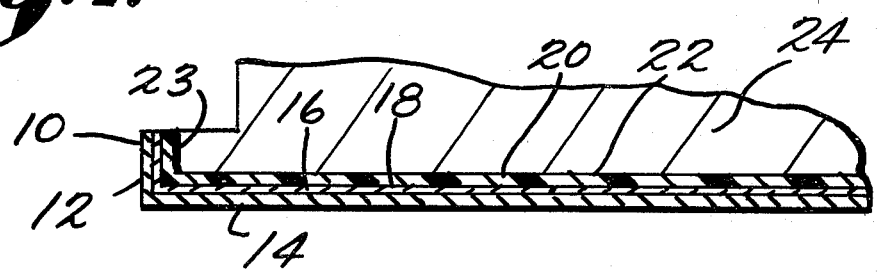
FIG. 1 is a sectional view in elevation of the plated mold element, the resin composition and the building block of the present invention.
Figure 2:
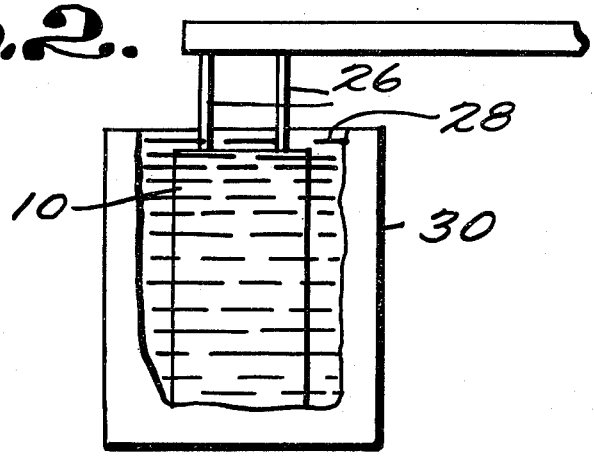
FIG. 2 is a view in elevation, partly in section, of the metal coating operation of the present invention.

Turning now to the drawings, wherein like numerals designate corresponding elements throughout the several views, there is shown in FIG. 1 a mold 10 which is preferably made of mild steel and is used for its characteristics of uniformly conducting heat. Mild steel is defined as a steel which has a maximum carbon content no greater than 0.25%. Hot or cold rolled steel or aluminum may also be employed. The mold 10 should be of a shape to accommodate a side edge 23, one surface 22 of a building block 24 a portion of which is illustrated in FIG. 1. Thus, the mold 10 will have four side walls, one of which is indicated at 12 and a bottom exterior surface 14 which is generally planar. The interior surface 16 of the mold 10 has been plated with a nickel coating 18, as described hereinafter.

In carrying out the method of the present invention, the molding composition which may include a resin, pigment, filler and plasticizer, as described in the aforementioned patents, is milled into a flowable form and then deposited in the mold 10 and spread over the appropriate interior surfaces of the mold. The masonry block 24 is then inserted into the mold and the weight of the block 24 will distribute the composition 20 to a substantially uniform extent over the subjacent surfaces of the mold 10. In many applications, it may be desirable to constitute the molding composition so that it is substantially in liquid form to facilitate even distribution over the mold surface. With the face of the block 24 inserted as illustrated in FIG. 1 into the mold 10, the mold and block with the coating composition 20 therebetween are then subjected to heat to cure the molding composition 20. In one method, a plurality of molds 10 are mounted on a conveyor which is passed through an oven over radiant heaters where the surface 14 is directly exposed to the radiant heat which cures the molding composition 20 so as to bond the composition to the surfaces 23 and 22 of the block 24. After curing, the mold with the bonded resins cured thereto is removed from the mold 10.

In preparing the mold 10 for use with the method of the present invention, the mold 10 may be suspended by arms 26 in a plating solution 28 maintained in a tub 30.

The electroless plating solution that has been used is as follows:
nickel sulfate—25 ounces/gallon of solution
nickel chloride—17 ounces/gallon of solution
boric acid—7 ounces/gallons of solution where the pH is maintained at 3.7–4.2

The plating is carried out at a temperature of approximately 185°–200° F. although temperatures in the range of 140°–150° F. have been used. Preferably, the water used is de-ionized.

Figure 3:
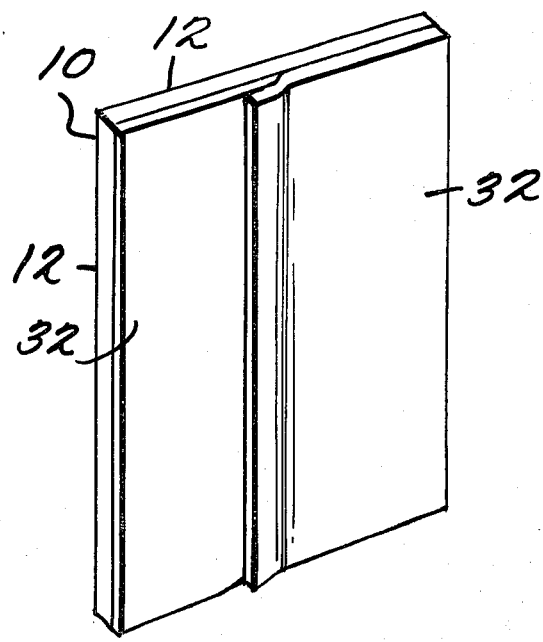
FIG. 3 is a perspective view from the rear of a masked bottom exterior surface of a mold of the present invention.
Figure 4:
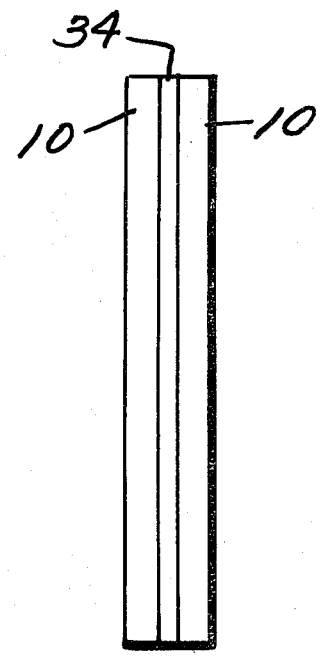
FIG. 4 is a side view in elevation showing another disposition of two mold elements which have their peripheries taped to mask the bottom surfaces thereof prior to being subjected to the electroless deposition process of the present invention.

Since the electroless deposition of nickel supplies a bright finish to the surfaces of the mold 10, according to the method of the present invention, the bottom surface 14 of the mold should be masked as illustrated in FIG. 3 to prevent the deposition of nickel thereon so that the radiant heat will not be reflected away from the mold. Preferably one or more strips of a suitable masking material such as tape 32 may be applied to the bottom surface 14 as illustrated in FIG. 3 before the mold 10 is placed in the solution 28. Lead tape has been used effectively in this case. For economy of manufacture, two molds 10 may be placed back-to-back as illustrated in FIG. 4 with the periphery of the molds masked by a tape 34 so that two molds may be plated simultaneously with their backs 14 masked by the tape 34.

In order to increase the efficiency of heat absorption by the bottom surface 14 of each mold 10, the bottom surface should be oxidized after the nickel plating step. The oxidation of the surface 14 may be accomplished in any conventional manner such as by coating the surface with an oxidizing solution and one that preferably also greatly darkens the surface 14. Passing oxygen gas over the surface to be oxidized while applying heat will also oxidize the metal fairly rapidly.

Of course, where the mold is made of mild steel, any other type of layer on the exterior surface 14 that increases the heat absorbing capacity of the metal of the mold may be employed. For example, a black enamel paint may be used and has proven effective for short periods of time before re-coating with the black paint is necessary. It is important of course that the coating on the surface 14 be non-reflective. In some instances, where the masking tapes 32 and 34 are not employed, and the bottom surface is coated with the nickel by the electroless deposition process, one need merely oxidize the nickel layer to form nickel oxide.

While the preferred metal for depositing on the mold surface is nickel, it will be understood by those skilled in this art that other metals may be employed and a number of commercial baths are available and are described in "Metal Finishing Guidebook and Directory", Metals and Plastics Publications, Inc., Hackensack, N.J. (updated yearly), the disclosure of which is incorporated herein by reference and relied upon. The process and character of the electroless platings are discussed in *Kirk-Othmer Encyclopedia of Chemical Technology, Third Edition, Volume* 8, pages 738–750, John Wiley & Sons (1979), the disclosure of which is incorporated herein by reference and relied upon together with each and every reference cited therein.

Having described the invention, it will be apparent to those skilled in this art that various modifications may be made thereto without departing from the spirit and scope of this invention as defined in the appended claims.

What is claimed is:

1. In a method of forming an article with a curable resinous composition, the steps comprising: depositing a resinous composition in a mold made of mild steel and having an interior molding surface that has been coated with an electroless deposition layer of a metal that is non-reactive with the resin composition, and the said mold having an exterior surface that has been oxidized, subsequently exposing the mold and composition to heat sufficient to cure the composition, and thereby form the article, and then removing the formed article from the mold.

2. In a method of coating a portion of a support member with a curable resinous composition, the steps comprising: depositing the resinous composition in a mold made of mild steel having an interior molding surface that has been coated with an electroless deposition layer of a metal that is non-reactive with the resinous composition, and the said mold having an exterior surface that has been oxidized, placing a support member in the mold with a surface thereof in contact with the composition, subsequently exposing the mold, composition and support member to heat sufficient to cure said composition, and then removing from the mold the support member with the cured resinous composition affixed thereto.

3. The method as claimed in claims 1 or 2 including the step of using a polyester resin composition.

4. The method as claimed in claims 1 or 2 wherein the resin is a sand filled polyester resin composition.

5. The method as claimed in claim 4 wherein the sand is about 50% by weight of the composition.

6. The method as claimed in claim 5 wherein the composition includes a pigment.

7. The method as claimed in claims 1 or 2 wherein the metal that is electrolessly deposited in the molding surface is nickel.

8. The method as claimed in claim 7 wherein said mold is made of a hot rolled steel.

9. The method as claimed in claim 7 wherein said mold is made of a cold rolled steel.

10. A mold for the manufacture of a molded article with a resin composition, said mold being made substantially from mild steel and having an interior forming surface on which a metal has been electroslessly deposited, said mold having an exterior surface which, in use, is exposed to heat, said exterior surface having a heat absorbing oxidation layer thereon.

11. The mold as claimed in claim 10 wherein said metal that is electrolessly deposited is nickel.

12. The mold as claimed in claim 10 wherein the surfaces of said mold are plated with nickel and the said oxidation layer on said exterior surface is nickel oxide.

13. In a method of plating a mold pan made of mild steel having a forming surface and an exterior surface that is exposed to heat in the molding process where a resin coating is molded on an article, the steps comprising: masking said exterior surface of the mold with masking material, disposing said mold in a plating solution to electrolessly deposit a metal on the unmasked surface of the mold, and subsequently removing the mold from the solution and removing the masking material, and further including the step of oxidizing said exterior surface to enhance the heat absorption capacity of said exterior surface.

14. The method as claimed in claim 13 wherein the masking material is lead tape.

15. The method as claimed in claim 13 including the step of disposing two substantially identically dimensioned mold pans together with the exterior surfaces of each pan facing each other and with said masking material enclosing and sealing the peripheries of the exterior surfaces.

16. The method as claimed in claim 15 wherein said masking material is lead tape.

17. The method as claimed in claim 13 wherein the electrolessly deposited metal is nickel.

* * * * *